May 2, 1950  A. J. STANLEY  2,505,802
TAB STRIP FEED AND APPLYING DEVICE
Filed Aug. 9, 1946  11 Sheets-Sheet 1

INVENTOR.
ALEXANDER J. STANLEY

BY
ATTORNEY

May 2, 1950     A. J. STANLEY     2,505,802
TAB STRIP FEED AND APPLYING DEVICE
Filed Aug. 9, 1946     11 Sheets-Sheet 2

INVENTOR.
ALEXANDER J. STANLEY

BY
ATTORNEY

May 2, 1950 A. J. STANLEY 2,505,802
TAB STRIP FEED AND APPLYING DEVICE
Filed Aug. 9, 1946 11 Sheets-Sheet 3

INVENTOR.
ALEXANDER J. STANLEY

ATTORNEY

May 2, 1950  A. J. STANLEY  2,505,802
TAB STRIP FEED AND APPLYING DEVICE
Filed Aug. 9, 1946  11 Sheets-Sheet 4
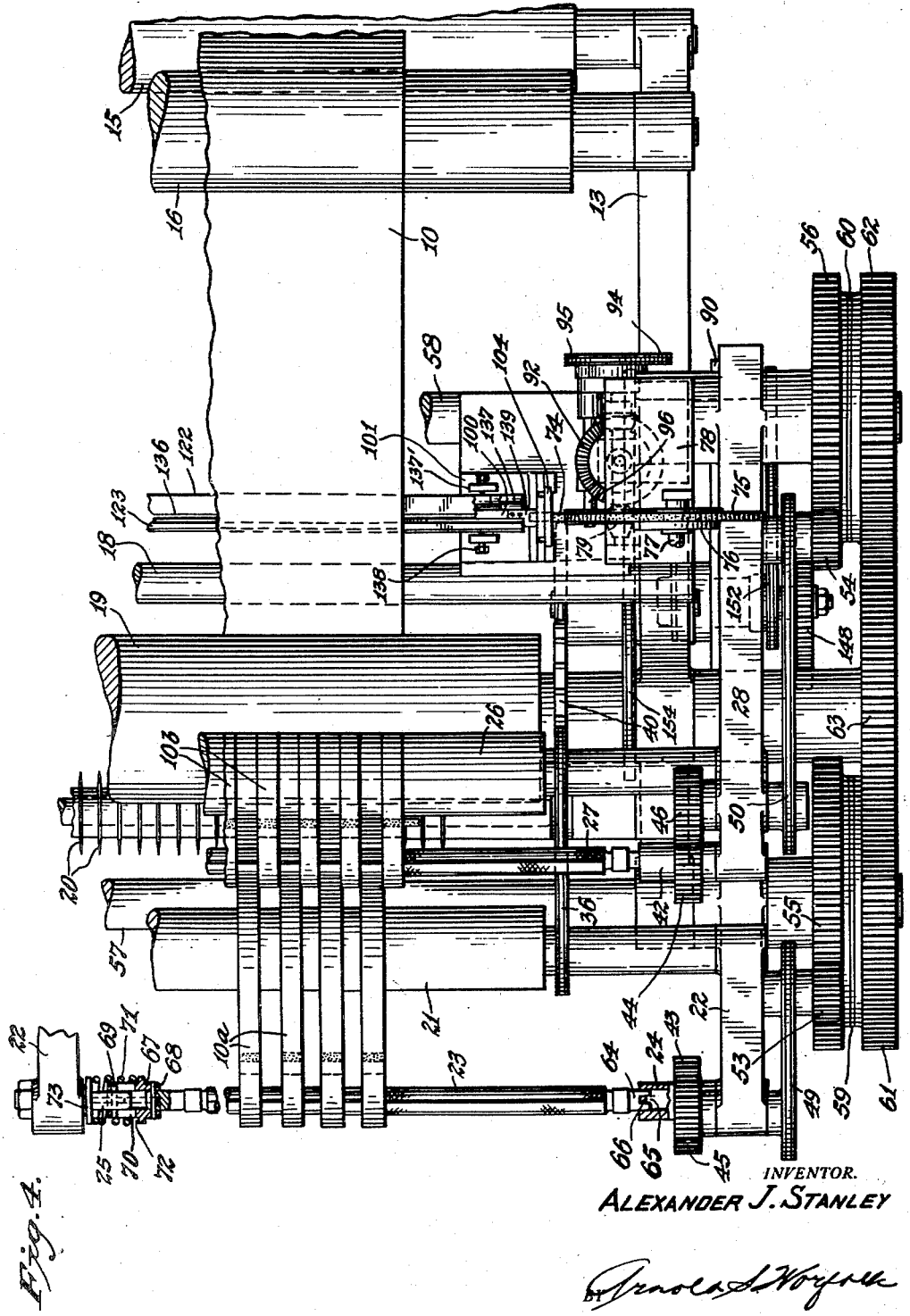
INVENTOR.
ALEXANDER J. STANLEY
ATTORNEY

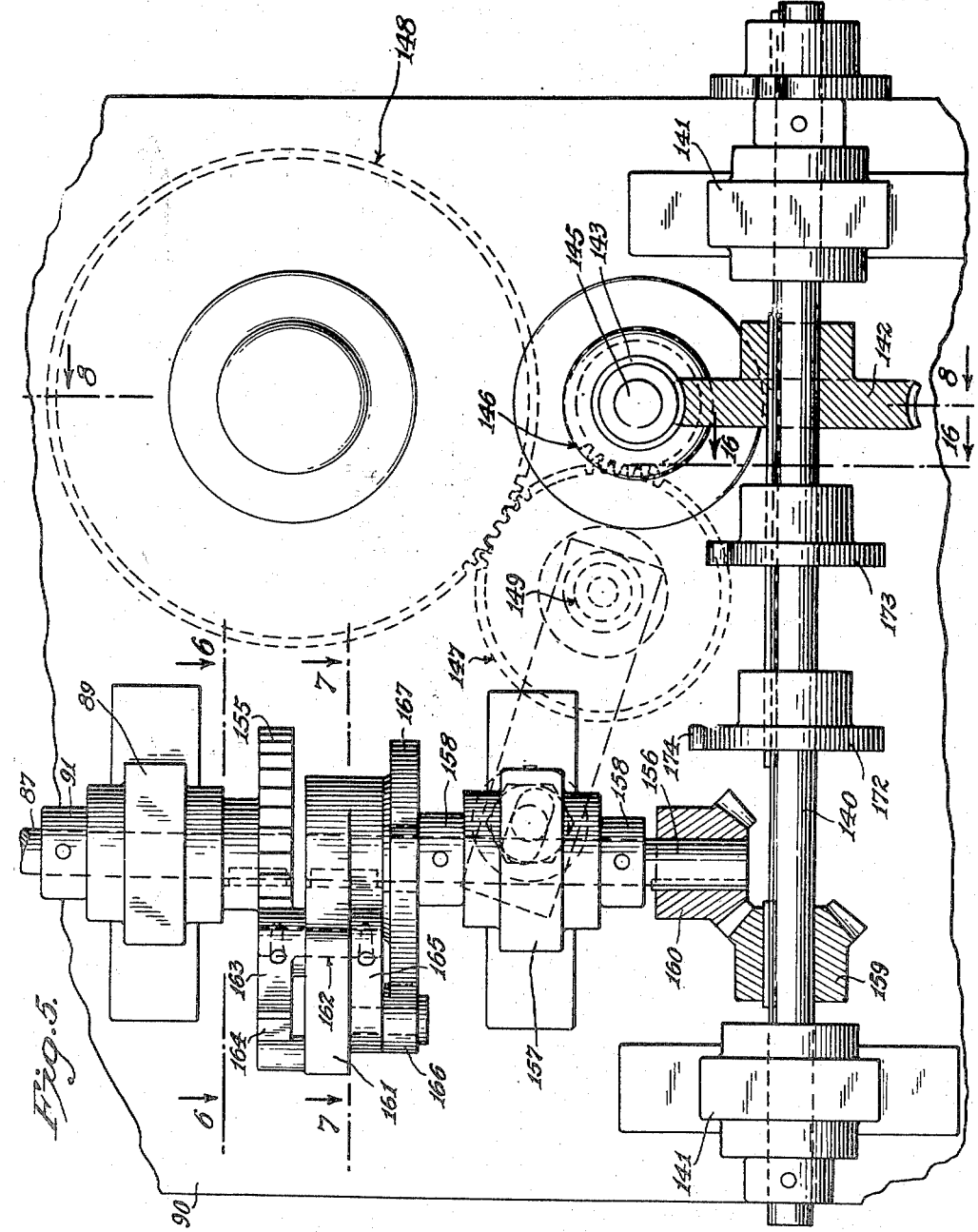

May 2, 1950 A. J. STANLEY 2,505,802
TAB STRIP FEED AND APPLYING DEVICE
Filed Aug. 9, 1946 11 Sheets-Sheet 6
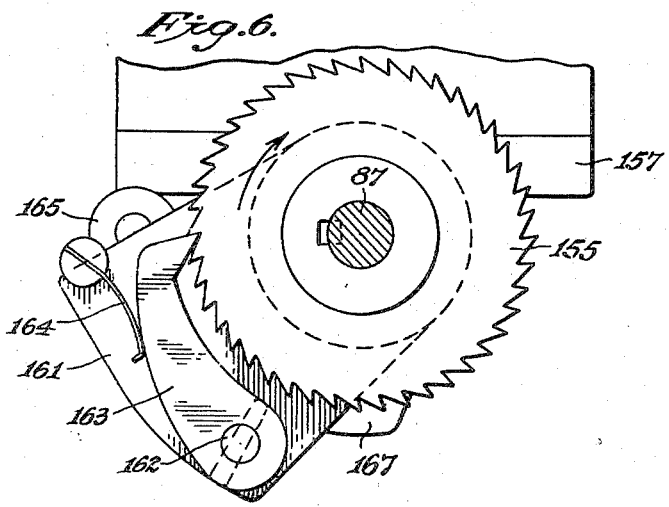
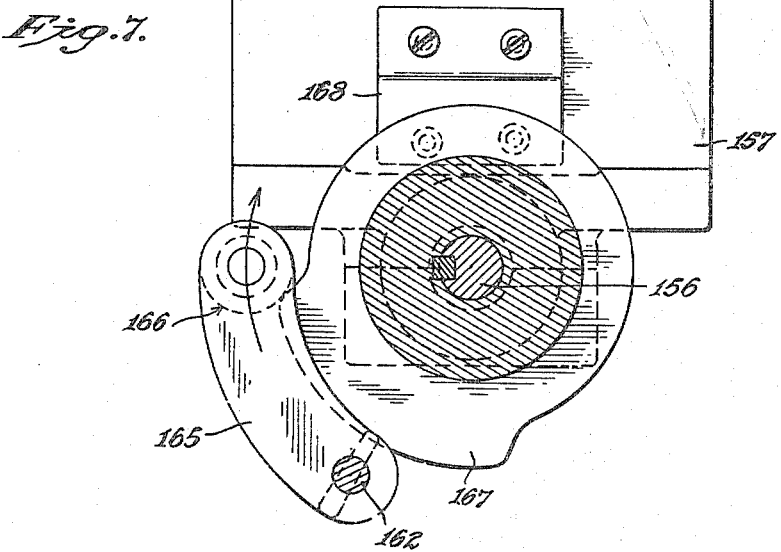
INVENTOR.
ALEXANDER J. STANLEY
ATTORNEY

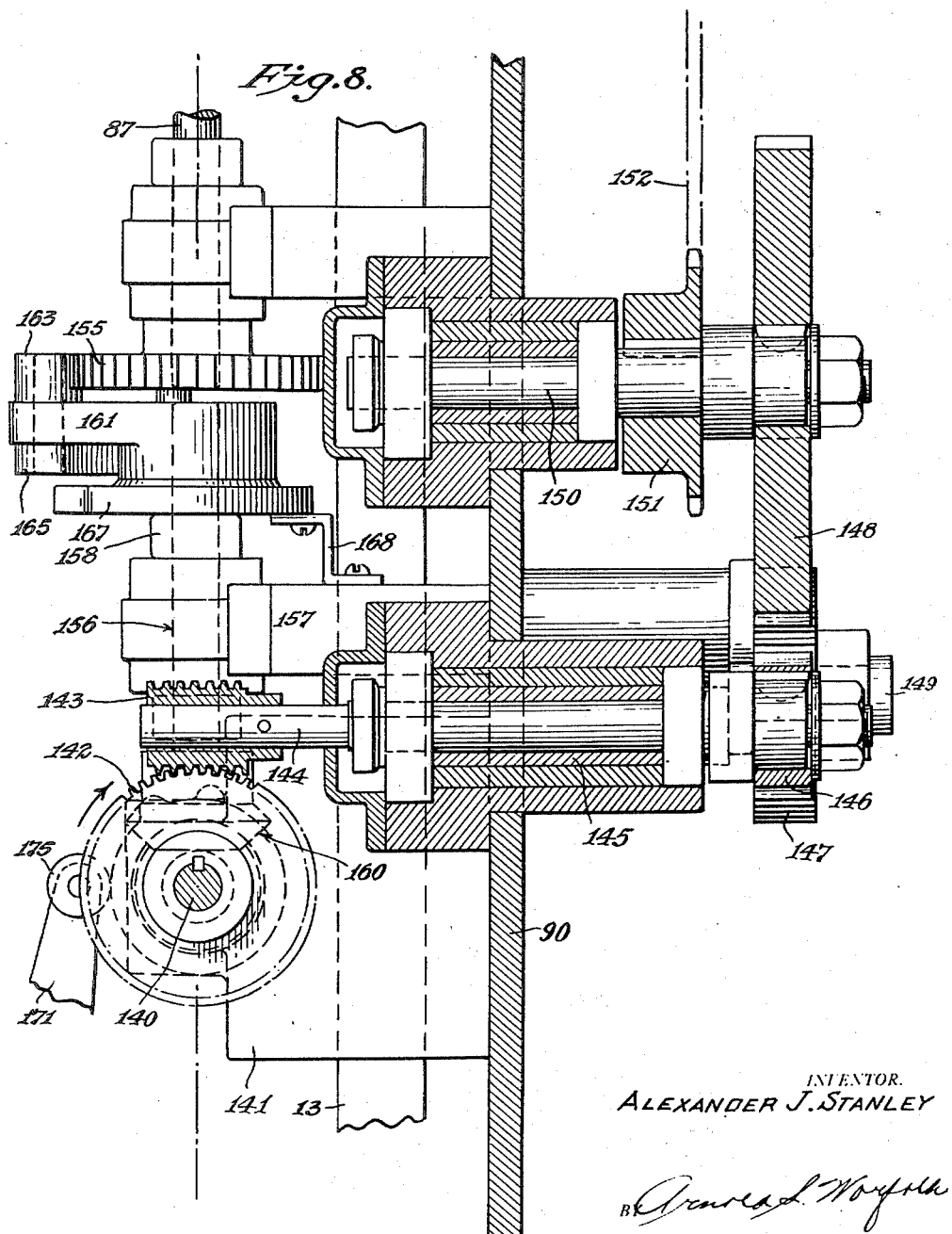

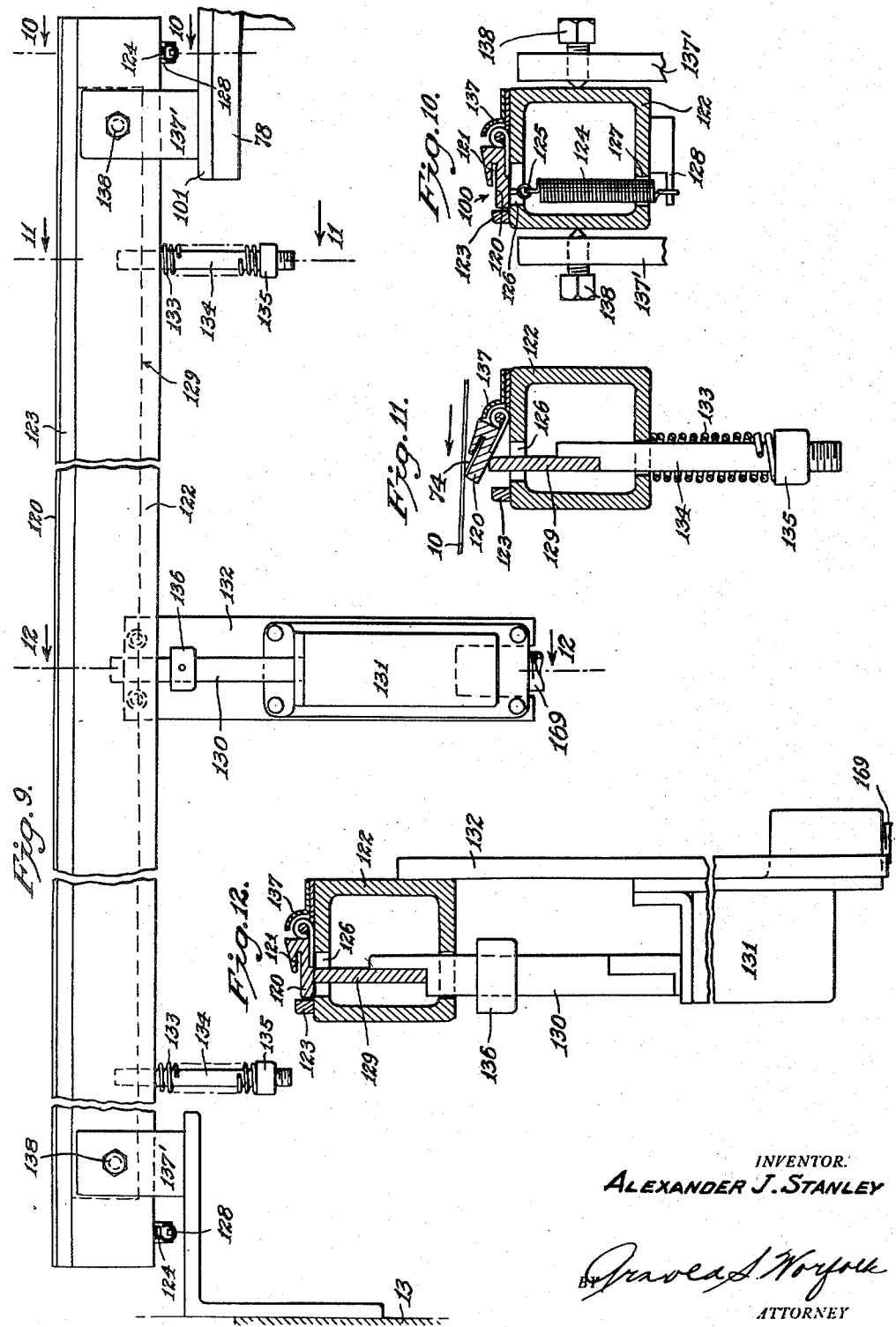

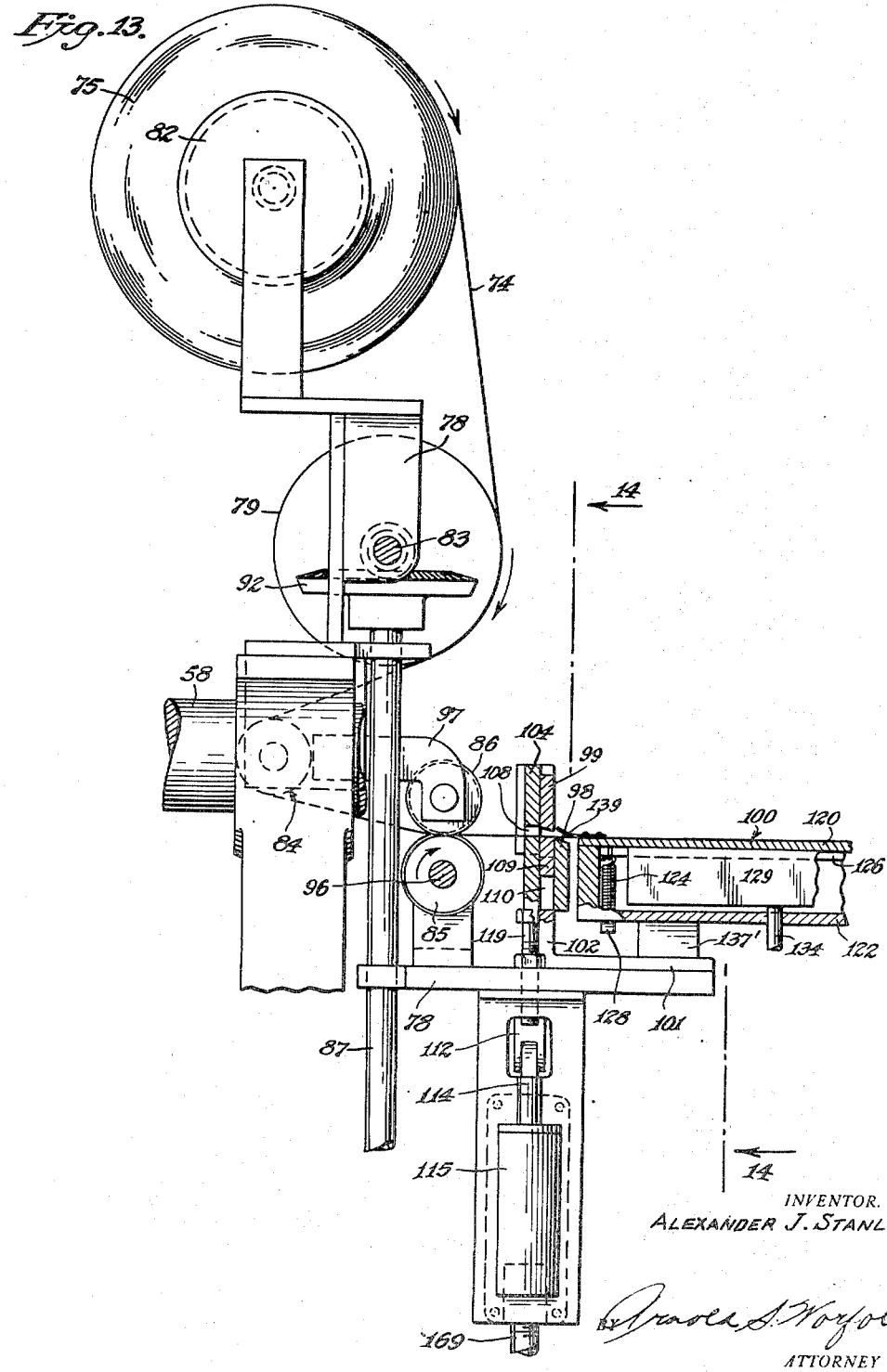

May 2, 1950 A. J. STANLEY 2,505,802
TAB STRIP FEED AND APPLYING DEVICE
Filed Aug. 9, 1946 11 Sheets-Sheet 10
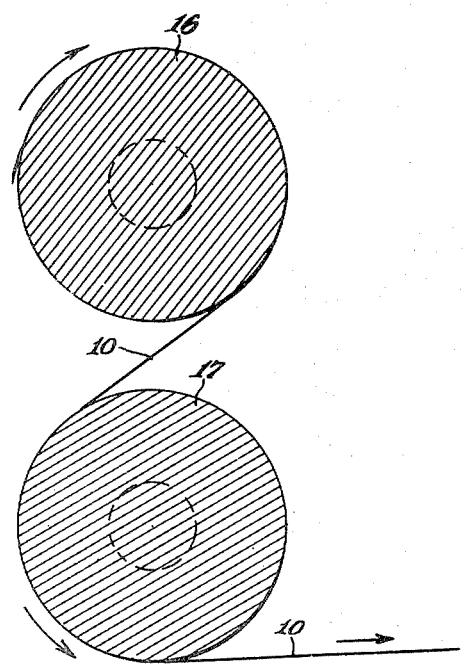
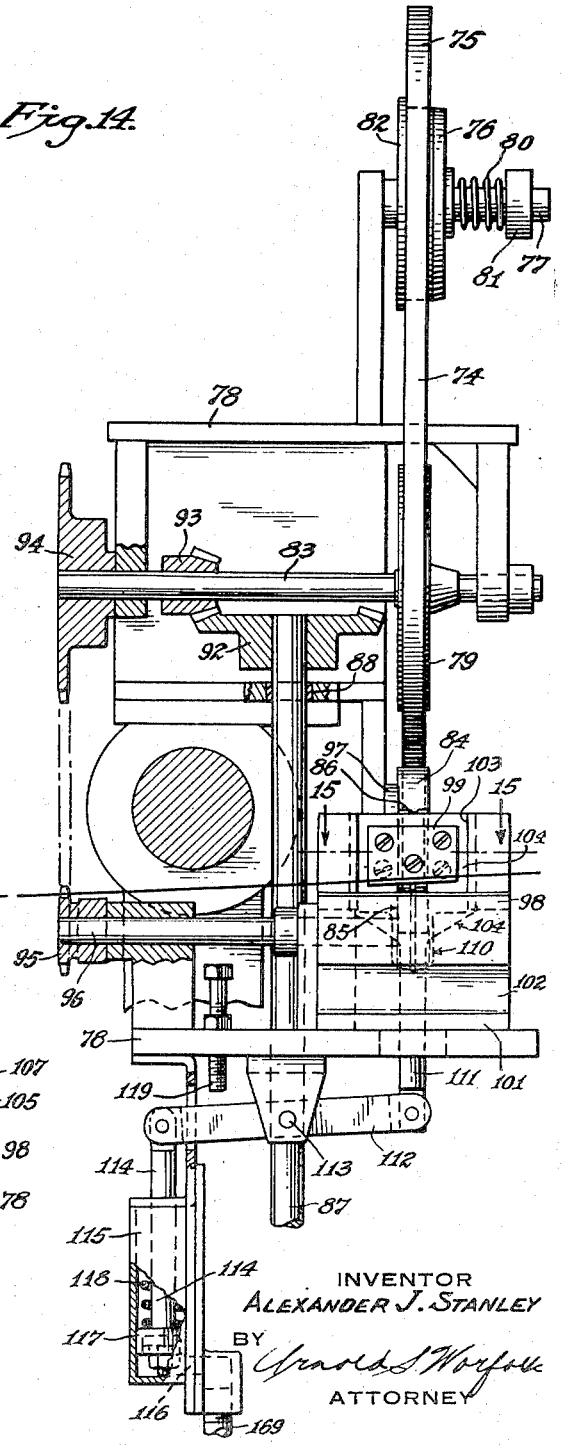
INVENTOR
ALEXANDER J. STANLEY
BY
ATTORNEY

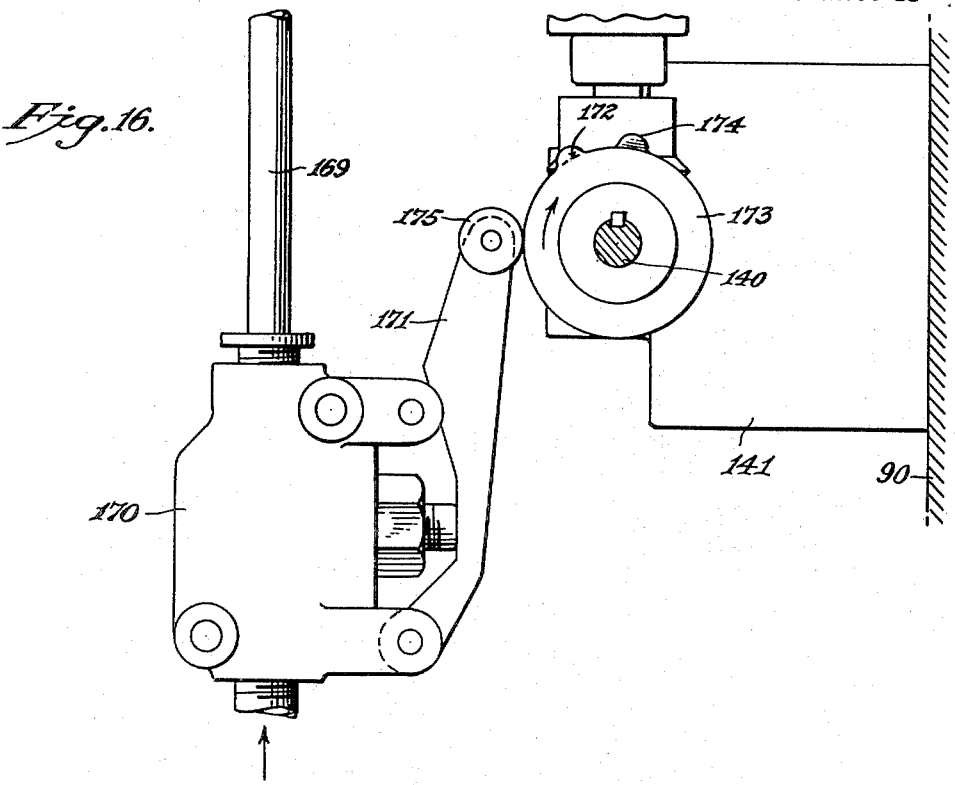

Patented May 2, 1950

2,505,802

UNITED STATES PATENT OFFICE 2,505,802

TAB STRIP FEED AND APPLYING DEVICE

Alexander J. Stanley, North Brunswick Township, Middlesex County, N. J., assignor to Industrial Tape Corporation, a corporation of New Jersey Application August 9, 1946, Serial No. 689,358

10 Claims. (Cl. 154—36)

This invention relates to a machine for applying tab strips at predetermined intervals along a traveling sheet or web. More particularly it relates to a machine equipped with driving mechanism for causing a web to travel from one position in the machine to another, and with devices for feeding a tab strip transversely of the traveling web, severing a predetermined length thereof and applying the severed length to the traveling web at a predetermined position governed by instrumentalities which are operated in timed relation with the web driving mechanism.

The invention has been illustrated as applied to a web slitting machine of the score cutting type. In such a machine, a traveling web which may be coated on one side with a pressure-sensitive adhesive, is drawn from a bundle roll and guided, by means of suitable rolls, through the machine to a slitting station where the web is cut longitudinally into narrow strips or tapes. Alternate strips pass to one mandrel supporting a plurality of cores on which the strips are wound, whereas the remaining strips pass to a second mandrel similarly equipped with cores for the same purpose. Such machines are provided usually with starting and stopping devices whereby, after the leading ends of the strips of tape are started on their respective cores, operation of the machine may be inaugurated and continued until predetermined lengths of tape have been wound up, whereupon the machine may be brought to rest and a new set of cores brought into position ready for the next wind-up operation.

With some types of pressure-sensitive adhesive tape it is desirable to apply a non-adhesive strip or tab to the adhesive at the leading end of the tape so that such end may be grasped and separated from the underlying layer or convolution with facility. The present invention permits such tabs or strips to be applied automatically and not manually as heretofore.

In accordance with the invention, there is located adjacent one edge of the adhesive web as it travels through the machine and in advance of the web slitting position, a device which supports a roll of tab material in strip form. During the travel of the web, the strip of tab material is fed endwise through a guideway which is located beneath the traveling web adjacent the side thereof to which the adhesive has been applied. When the table strip has traveled the full width of the traveling web, its feed is automatically arrested and a knife operated automatically to sever from the roll of tab material that portion of the strip which lies in the guideway beneath the web. Thereafter, and at a point in the machine cycle which is determined by the length of web that has traveled past the strip applying position since the application of the previous strip, mechanism is operated automatically to lift the tab strip into engagement with the traveling web which, being adhesive, grasps the tab strip and carries it along. The tab strip feeding cycle thereupon is reinaugurated.

After the web has picked up the tab, it continues its travel past the slitting device so that there will be a tab associated with each individual strip of tape into which the web has been slit. The machine is brought to rest as the tabs arrive adjacent the cores on which the tapes are wound, enabling the individual tapes to be cut at a position which leaves the tab exposed at the outer end of the roll of tape. The tapes at the leading end of the traveling web then may be started on new cores for the next tape wind-up operation.

The tab strip feeding, severing and applying devices are controlled from timing mechanism which makes one cycle of operation for each tab strip that is applied to the traveling web. Thus, by driving the timing mechanism in timed relation with the travel of the web through the machine, as by the use of suitable gearing, it is apparent that the tab strip may be applied to the web at equal intervals of any desired length along the web in its travel through the machine.

Referring to the drawings:

Fig. 4 is a partial plan view illustrating a portion at the right of the machine shown in Fig. 1;

Fig. 5 is an elevation, looking at the parts from the right, and showing the timing mechanism for controlling the operation of the tab strip feeding mechanism, the tab strip severing mechanism and the tab applying mechanism;

Fig. 6 is a horizontal sectional view on line 6—6 of Fig. 5;

Fig. 7 is a horizontal sectional view on line 7—7 of Fig. 5;

Fig. 8 is a vertical sectional view on line 8—8 of Fig. 5;

Fig. 9 is a front elevation of the mechanism for applying the tab strip to the traveling web;

Fig. 10 is a vertical sectional view on line 10—10 of Fig. 9, showing the parts in their normal position;

Fig. 11 is a vertical sectional view on line 11—11 of Fig. 9, but showing the parts in the act of applying the tab strip to the traveling web;

Fig. 12 is a vertical sectional view on line 12—12 of Fig. 9;

Fig. 13 is a rear elevation of the tab strip feeding mechanism, the tab strip severing mechanism and the tab strip applying mechanism, the latter two mechanisms being shown in section;

Fig. 14 is a fore and aft vertical sectional view on line 14—14 of Fig. 13;

Fig. 15 is a horizontal sectional view on line 15—15 of Fig. 14; and

Fig. 16 is a vertical sectional view on line 16—16 of Fig. 5.

Figure 1:
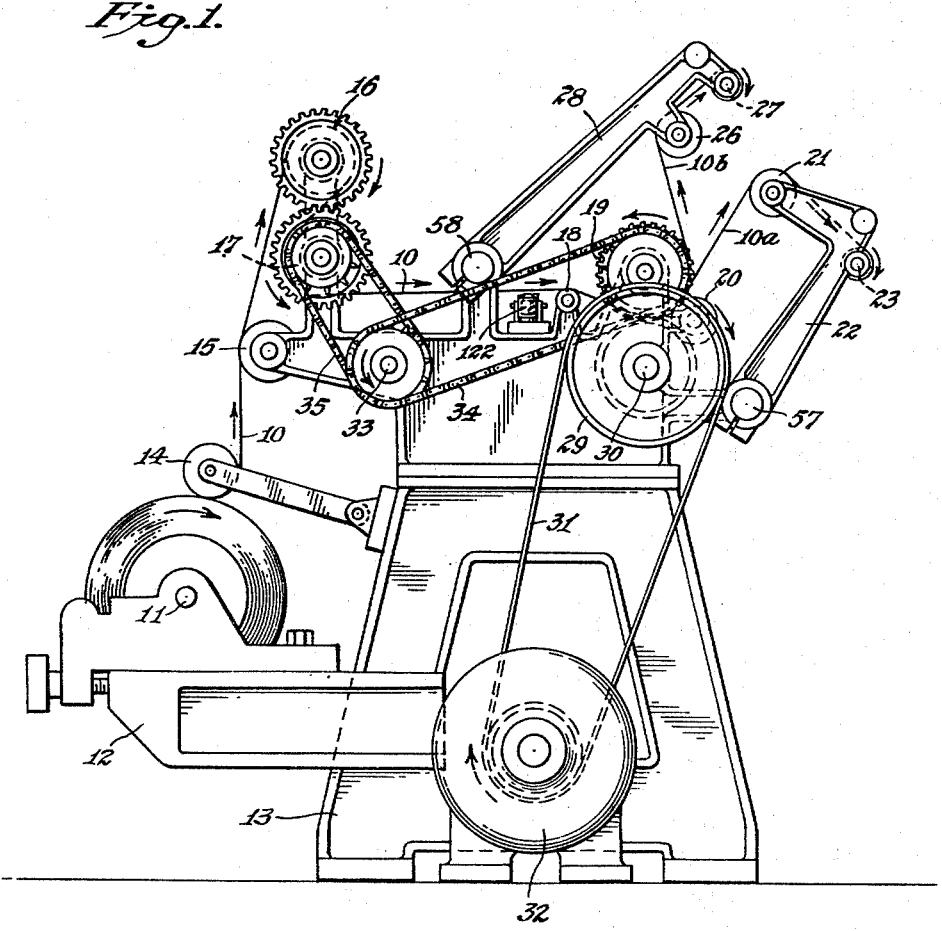
Fig. 1 is a left-end elevation of a machine equipped with the present improvements.
Figure 2:
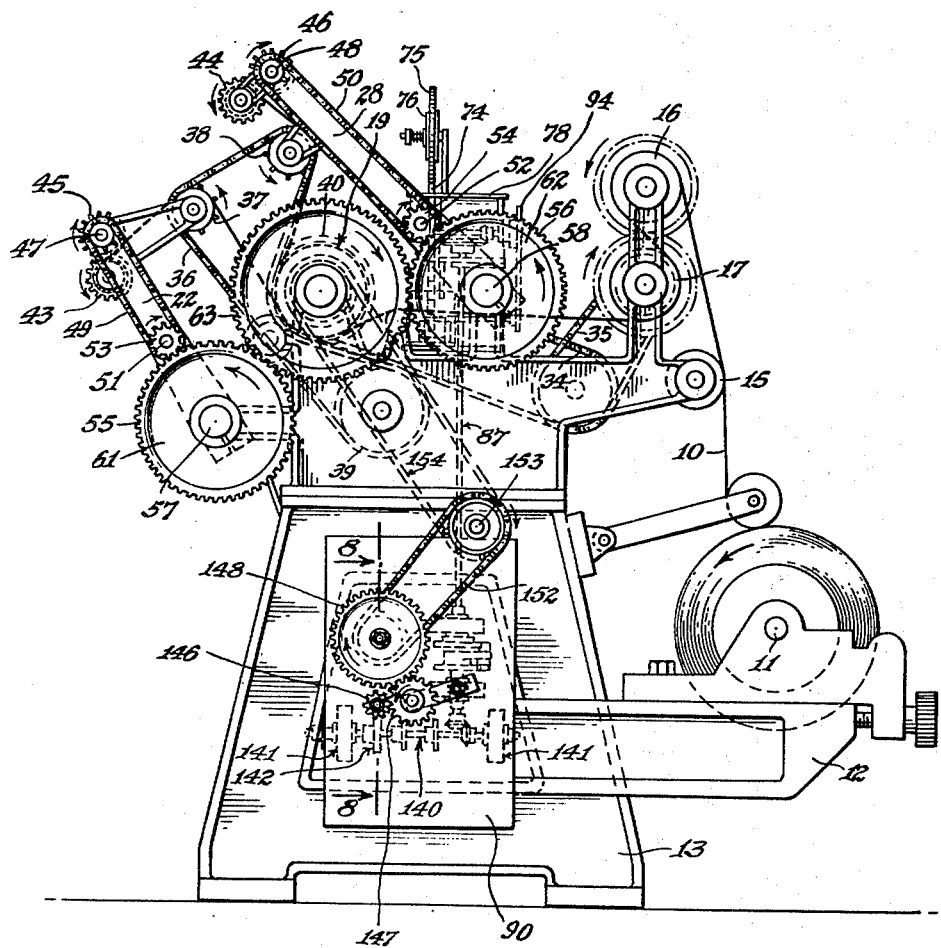
Fig. 2 is a right-end elevation of the machine shown in Fig. 1.
Figure 3:
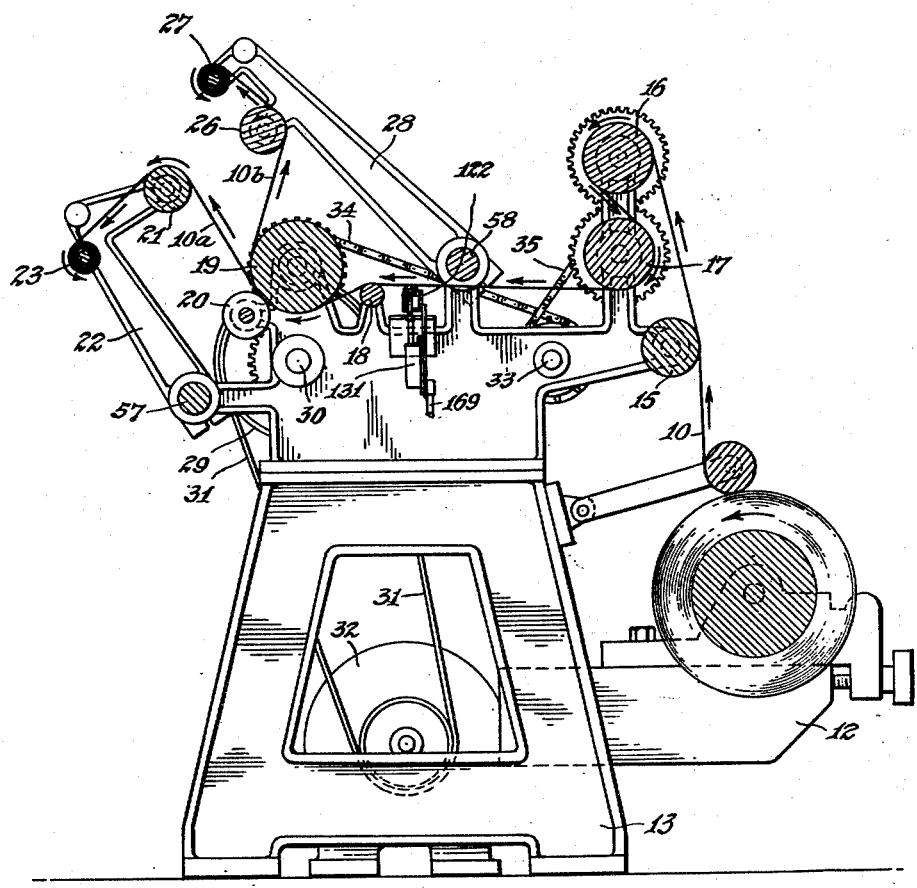
Fig. 3 is a vertical central section on a fore and aft plane through the machine shown in Fig. 1, looking at the parts from the right.

In the embodiment of the invention illustrated, a bundle roll of adhesive sheet material 10 is supported on a mandrel 11 arranged in fixed brackets 12 supported on the machine frame 13 at the rear (Figs. 1, 2 and 3). The sheet material or web 10 is pulled upwardly off the bundle roll, past guide rolls 14 and 15 and thence over and around the upper of a pair of vertically spaced horizontally disposed S rolls 16 and 17. Both the rolls 16 and 17 which are arranged one directly above the other, are positively driven and since the adhesive side of the web 10 is in contact with the upper roll 16 for about three-quarters of its periphery, the tension exerted on the adhesive web is sufficient to pull it with facility off the bundle roll. After leaving the surface of the upper roll 16, the web passes through the space between it and the lower roll 17, toward the rear of the latter, and then around the lower roll which it leaves traveling in a forward direction toward the front of the machine.

From the roll 17 the web passes over a guide roll 18 and then under a platen roll 19 where the sheet is slit longitudinally into a plurality of tapes of narrow width 10a and 10b by a gang of circular knives 20 spaced along the platen roll with which the knives are in edgewise engagement (Figs. 1, 2, 3 and 4). After the slitting operation, every other strip of tape 10a passes over a guide roll 21 supported at its opposite ends for rotation in bearings presented at the upper ends of a pair of arms 22 which are mounted one at each side of the machine frame at the front. From the guide roll 21 the tapes 10a travel to one or another of the series of cores which are spaced along a mandrel 23 which is detachably mounted at its opposite ends on short stub shafts 24, 25, which likewise are journalled for rotation in the bearings presented by the arms 22. A guide roll 26 and a core supporting mandrel 27 provide a similar disposition for the intermediate strips of tape 10b. The guide roll 26 and mandrel 27 are mounted in the same fashion as the guide roll 21 and mandrel 23 in a pair of arms 28. The arms 28 are likewise arranged one on each side of the machine frame.

The S-rolls 16 and 17 which are arranged one above the other adjacent the rear of the machine, the platen roll 19, the two guide rolls 21 and 26 and the two mandrels 23 and 27, on which the wind-up cores are mounted, are all driven by mechanism best illustrated in Figs. 1, 2 and 4. The driving mechanism includes a pulley 29 fixed on a short shaft 30 which is mounted for rotation in the left side frame of the machine. The pulley 29 is driven through a belt 31 from a motor 32 secured at the base of the machine. The pulley shaft 30 gear drives the platen roll 19 which in turn chain drives the S-rolls 16, 17, at the rear of the machine which are geared together for this purpose. The chain drive between the platen roll and the S-rolls includes an idler shaft 33 on which there are fixed a pair of sprockets connected by chains 34 and 35 with similar sprockets fixed on the platen roll and the lower S-roll 17 respectively (Fig. 1).

The guide rolls 21 and 26, over which the tapes 10a and 10b pass after leaving the platen roll, are also chain driven. The drive is from the platen roll 19 and since their direction of rotation is counter to that of the platen roll the drive is effected by a chain 36 which is looped around sprocket wheels 37 and 38 fixed at the right ends of the guide rolls 21 and 26 and an idler sprocket 39 rotatably mounted in the machine frame, the chain loop being driven externally from a sprocket 40 on the platen roll. (Fig. 2).

The core supporting mandrels 23 and 27 are rotated by virtue of the rotation of a pair of stub shafts 24 and 42 into which the right hand ends of the mandrels are received for ready removal and replacement (Fig. 4). The stub shafts 24 and 42 are equipped with pinions 43 and 44 meshing with pinions 45 and 46 likewise fixed on short stub shafts 47 and 48 journalled respectively in the arms 22 and 28 (Figs. 2 and 4). These stub shafts 47 and 48 are driven through chains 49 and 50 from stub shafts 51 and 52 journalled lower down in the arms 22 and 28. The stub shafts 51 and 52 are equipped with pinions 53 and 54 which mesh with large gears 55 and 56 rotatably mounted at the ends of shafts 57 and 58 which extend crosswise of the machine and give it lateral stability. The gears 55 and 56 are connected by friction clutches 59 and 60 to identical gears 61 and 62 mounted for rotation on the same shafts and these gears are in turn driven by a large gear 63 fixed at the right end of the platen roll 19. The gear connections are such that there is a tendency to overdrive the wind-up mandrels 23 and 27. Overdriving the mandrels through the slip clutches 59 and 60 enables the mandrels to accommodate their speed to that which will compensate for the increasing diameters of the rolls of tape as they are wound up and to maintain proper tension in the tape.

As previously stated, the wind-up mandrels 23 and 27 are designed for ready removal and replacement to permit the substitution of new sets of cores after each wind-up operation (Fig. 4). To this end, the mandrels 23 and 27 are formed each at its right end with a cylindrical portion 64 presenting a slot 65. The slot at the right end of the mandrel 23 is adapted to engage a pin 66 extending transversely across a recess in the stub shaft 24 which is designed to receive the cylindrical end of the mandrel. This construction which is the same in the case of each mandrel provides a positive drive between the stub shafts 24 and 42 and the respective mandrels 23 and 27. Each mandrel is similarly formed at its opposite end where it is arranged to engage in the hollow end of a sleeve 67 which is equipped with a cross pin 68 to engage the slot in the end of the mandrel. The sleeve 67 is arranged for limited endwise movement along the rotatable stub shaft 25 as determined by a pin 69 extending transversely through the stub shaft and into longitudinal slots 70 formed in the sleeve. A compression spring 71 encircling the sleeve and reacting between a shoulder 72 thereon and a shoulder 73 on the stub shaft serves to hold the mandrel in the machine during the tape wind-up operation. However, when it is desired to remove the mandrel to substitute another set of cores, it is necessary only to press the mandrel endwise to the left, against the compression of the spring 71 until the mandrel at its right end can be moved clear of the stub shaft, whereupon the mandrel can be withdrawn from the sleeve 67 at the left end of the mandrel.

The tab strip 74 is applied to the traveling web 10 at a position just in advance of the guideroll 18. The tab strip is preferably of narrow width paper (although the invention is by no means limited thereto). The paper preferably is in the form of a roll 75 located on a core 76 which, in turn, is mounted for rotation on a short fore-and-aft pin 77 arranged in a fixed bracket 78 located at the right of the traveling web 10 when looking at the machine from the front (Figs. 13 and 14). The tab strip is pulled off the supply roll 75 by a driven pulley 79 against a slight drag exerted by a compression spring 80 buttressed by a collar 81 on the pin 77, and which presses the core 76 against a face plate 82 arranged on the pin adjacent the opposite face of the core. The pulley 79 is mounted on a fore-and-aft shaft 83 journalled at its opposite ends in outboard bearings presented by the fixed support 78. The tab strip passes around the pulley 79, thence to an idler guide roll 84 which is located in a position such that a substantial length of tab strip remains in contact with the pulley's periphery. From the guide roll 84 the tab strip passes between a pair of rolls 85 and 86 which lie one above the other with just sufficient clearance to permit the passage of the tab strip therebetween. The lower roll 85 is a driven roll and the upper one 86 an idler whose motion is imparted to it by the paper strip as it is fed along. Since the tab strip is fairly flexible and is fed endwise in a manner later to appear, the rolls 85, 86 are formed one (the lower one 85) with a tongue and the other (the upper one 86) with a groove so that the narrow tab strip is crimped longitudinally as it passes between the rolls to increase its rigidity (Figs. 13 and 15).

The rotation of the shaft 83 on which the pulley 79 is mounted is effected from a vertical shaft 87 whose rotation is controlled in the manner hereinafter set forth. The vertical shaft 87 is journalled near its upper end in a bearing 88 presented by the fixed support 78 and at its lower end in a bearing 89 carried by a plate 90 which is fixed to the lower frame of the machine at the right (Figs. 2, 5 and 14). A collar 91, pinned to the shaft 87 just above the bearing 89, serves as a thrust bearing to hold the vertical shaft 87 against downward movement.

At the upper end of the vertical shaft 87, just above the top bearing 88, there is secured a beveled gear 92 which meshes with a beveled gear 93 fixed on the fore-and-aft horizontal shaft 83 which carries the drive pulley 79. At the rear end of the rotatable shaft 83 there is fixed a sprocket wheel 94 having a chain drive connection with another sprocket wheel 95 fixed at the rear end of a fore-and-aft shaft 96. The shaft 96 is rotatably mounted in bearings carried by a fixed part of the machine and is the shaft on which the tongued roll 85 is mounted. The grooved roll 86 which overlies the tongued roll is rotatably supported in a fixed bracket 97. According to this arrangement, the pulley 79 and the tongued roll 85 are driven, as the vertical shaft 87 rotates, to cause the tab strip 74 to be fed endwise transversely of the traveling web 10 and, of course, when the vertical shaft comes to rest, the feed of the tab strip is interrupted.

As the crimped tab strip 74 leaves the tongued and grooved rolls 85, 86, it is fed between a fixed blade 98 and a vertically movable blade 99 and thence into a guideway 100 which extends the complete width of the traveling web and directly beneath it (Figs. 13, 14 and 15). The knife blade mechanism consists in part of an angle iron support having a horizontal leg 101 secured to the fixed support member 78 and a vertical leg 102 which extends upwardly beyond the level of the traveling web. On the side of the vertical leg 102, adjacent the traveling web there is secured the fixed knife blade 98 whose cutting edge is substantially at the level of the guideway 100. The vertical leg 102 of the angle iron is cut away centrally for a substantial portion of its depth to form a recess 103 which accommodates the vertical movement of the knife blade 99 whose cutting edge, in its normal position, is located above the path of travel of the tab strip but which, when the knife is moved downwardly, cooperates with the cutting edge of the fixed blade 98 to shear the tab strip. The movable blade 99 is secured to a slide 104 which is arranged for vertical movement in grooves or guideways 105 defined by a pair of opposed vertical lips 106 presented by a pair of blocks 107 and the marginal edges of the angle iron leg 102 which are adjacent the cut away portion 103. The blocks 107 are secured to the angle iron leg 102 near the top and on the face thereof which is remote from the traveling web. The slide 104 is formed with an aperture 108 which, in the normal position of the parts, registers with the path of travel of the tab strip and permits its unhindered passage therethrough. There is secured to the slide immediately below the aperture a filler piece 109 which bridges the gap between the slide and the fixed knife 98 thereby preventing the tab strip from being caught between the slide and the fixed knife when the feed of the tab strip is inaugurated after a cutting operation. The vertical leg 102 of the angle iron has a smaller cut out portion 110 just below the wider cut out portion 103 to provide clearance for the filler piece 109 during the vertical movement of the slide.

The slide 104 tapers off to a narrow section 111 which extends downwardly through an aperture in the fixed member 78 on which the angle iron is supported. The section 111 at its lower end is pivotally connected at the front end of a link 112 centrally fulcrumed on a fixed pivot 113 and which, at its other end, is pivotally connected at the upper end of a piston rod 114 forming part of a cylinder and piston arrangement 115 designed for air operation (Figs. 13 and 14). An inlet 116 at the lower end of the cylinder permits the introduction of compressed air beneath a piston 117 therein which is fixed at the lower end of the piston rod 114. When that occurs, the piston is raised against the force of a compression spring 118 which reacts between the piston and the cylinder head. The upward movement of the piston 117, through the mechanism previously described, depresses the slide 104 causing the tab strip to be sheared by the cutting blades 98 and 99. The slide and consequently the blades are restored to their normal positions by the cylinder spring 118 when the air in the cylinder is released. The filler piece 109, on the return movement of the slide, raises the end of the tab strip sufficiently to insure clearance with the fixed blade 98 when its feed again is inaugurated. An adjustable set screw 119 which is threaded through the fixed support 78 overlies the fulcrumed rod 112 near the end thereof which is connected to the piston rod 114 and serves as an adjustable abutment properly to limit the degree of blade movement.

When the feed of the tab strip 74 is inaugurated, the leading end thereof passes over the stationary blade 98 and enters the long guideway 100 presented by a member 120 which underlies the traveling web 10 and extends transversely of the machine for the full width of the web (Figs. 9, 10, 12, 13 and 15). The member 120 is thicker adjacent its rear edge where it is milled to present a long slot 121 which constitutes part of the guideway in which the guide strip travels. The guideway construction is such that while the tab strip is supported at the bottom over its entire width, it is constrained at the top for only about half its width. The front marginal half of the tab strip is fully exposed from the top.

The guide member 120 is hinged at its rear edge to an underlying tubular member 122 substantially square in cross section and likewise extending transversely of the machine the full width of the traveling web. At the top of the tubular member and just in advance of the guide member 120 there is secured a bar 123 which, in the normal position of the hinged member, as shown in Figs. 10 and 12, extends slightly above the horizontal tab supporting surface and thus acts as a guide for the front edge of the tab strip.

The guide member 120 is held in its normal position by a pair of tension springs 124 connected one at each end of the guide member to an eye 125 projecting from the lower surface thereof through a long slot 126 formed in the top of the tubular member and which underlies the hinged guide member for substantially its full length. The springs 124 extend through holes 127 drilled in the bottom of the tubular member and are anchored at their lower ends to members 128 which are secured to the tubular member on its bottom surface. The guide member 120 remains in its normal position throughout the period that the tab strip is fed transversely of the traveling web, i. e., until the leading end thereof has reached or has gone slightly beyond the remote edge of the traveling web. Thereupon the feed of the tab strip is interrupted and the portion located in the guideway, severed by the knife mechanism previously described. After the tab strip 74 is severed, the guide member 120 is turned upwardly about its pivot from the position shown in Fig. 10 to the position shown in Fig. 11 wherein the front edge of the tab strip is caused to engage the overlying surface of the traveling web 10. Since the web, in the form of the invention illustrated herein, is provided on its under surface with a pressure sensitive adhesive, it grips the tab strip and draws it edgewise forwardly out of the guideway. Thereafter the traveling web passes over the guide roller 18 so that the tab strip is pressed into contact with the traveling web over its entire surface.

The mechanism for operating the guide member 120 includes a long vertically disposed plate 129 located in the tubular member 122 and whose upper portion extends through the slot 126 therein into underlying engagement with the bottom surface of the hinged guide member 120. The plate 129 is supported at the upper end of a piston rod 130 of a vertically disposed cylinder and piston mechanism 131, the cylinder of which is secured to a plate 132. The plate 132 is attached at its upper end to the tubular member 122 and extends downwardly therefrom for a distance sufficient to serve as the cylinder mechanism support. The cylinder and piston mechanism 131 is in all substantial respects similar to the cylinder and piston mechanism 115 previously described and when air is admitted to the lower end thereof its piston is raised to lift the plate 129 and operate the guide member 120 in the manner previously described. The plate 129 is lifted against the tension of the springs 124 and also against the action of a pair of springs 133 encircling a pair of vertical posts 134 which extend through holes in the bottom of the tubular member 122 and which are secured at their upper ends to the lifting plate 129 near the opposite ends thereof. The springs 133 react between the bottom of the tubular member 122 and collars 135 which are threaded on the posts 134. The arrangement is such that when the air pressure in the cylinder is released, the lifting plate 129 returns to its normal position with an even motion over its entire length. The tension springs 124 cause the guide member 120 to follow the lifting plate 129 to its normal position when the plate is lowered in the manner just described.

The upward movement of the lifting plate 129 is limited by a collar 136 fixed to the piston rod 130 and which is arranged to bank against the bottom surface of the tubular member 122. A stop 137 fixed on the tubular member 122 at the top and just to the rear of the guide member 120 acts as a safety to limit any overthrow of the guide member in its pivotal movement as might occur if the tension springs 124 were temporarily inoperative for any reason.

The tubular member 122 is supported, adjacent its opposite ends, between fixed uprights 137' spaced in a fore-and-aft direction and fixed on the machine frame. Each pair of supports is equipped with opposed set screws 138 which engage one at the front and the other at the rear of the tubular member, thereby to provide for a limited adjustment of the tubular member in all directions.

To complete the description of this phase of the machine, it should be noted that the leading end of the guideway, i. e., the end thereof which is adjacent the cutting knives, is equipped with a small plate member 139 which curves lightly above the fixed cutting blade 98 to insure that the tab strip 74 will enter the guideway each time its feed is inaugurated (Figs. 13 and 15).

As stated at the outset, the improved mechanism is designed to apply the tab strip to the traveling web at predetermined intervals along its length. To this end the various mechanisms which effect the feed of the tab strip, the severing thereof and its application to the traveling web are all controlled from a fore-and-aft cam shaft 140, journalled at its ends in bearings 141 fixed to the plate 90 which is supported on the lower machine frame at the right. (Figs. 2, 5 and 8). The cam shaft is driven from the platen roll 19 by mechanism which includes a worm wheel 142 which is splined to the cam shaft and driven by a worm 143 fixed at one end of a short shaft 144 journalled in a bearing 145 carried by the plate 90. At the other end of shaft 144 there is fixed a pinion 146 which is driven through a set of change gears 147 and 148, which are fixed at the ends of short stub shafts 149 and 150 journalled in bearings which are likewise mounted in the plate 90. The drive further includes a sprocket 151 fixed on the shaft 150 of the change gear, and a chain 152 connecting it with a sprocket on an idler shaft 153 which is turn is driven by a chain 154 from a sprocket on the platen roll 19.

The cam shaft 140 drives the vertical shaft 87 which operates the tab strip feed mechanism through devices which interrupt the feeding of the tab strip 74 when its leading end has arrived adjacent the remote edge of the traveling web and again pick up the drive of the tab strip feeding mechanism after the operation of the tab strip cutting mechanism and the mechanism which applies the tab strip to the traveling web. These devices are best shown in Figs. 5, 6, 7 and 8. At the lower end of the vertical shaft 87, just below the bearing 89, there is splined a toothed ratchet wheel 155. Immediately below and in coaxial alignment with the vertical shaft 87 there is another shorter shaft 156 which is journalled for rotation in a bearing 157 secured to the plate 90. The shaft 156 is held against vertical movement by a pair of collars 158 pinned thereto, one above and one below the bearing. The shaft 156 is driven from the cam shaft 140 through a pair of cooperating beveled gears 159 and 160. At the upper end of the shaft 156 there is splined a horizontally extending arm 161. The arm 161 is drilled near its outer end to accommodate a pivot pin 162 which extends vertically therethrough (Fig. 6). Above the arm 161 there is a pawl 163 fixed to the pin 162 and located in horizontal alignment with the ratchet wheel 155, and the pawl is pressed into engagement with the ratchet wheel by a leaf spring 164 which engages its outer edge. The leaf spring is anchored at one end in the rotatable arm 161. At the lower end of the pivot pin 162, i. e., beneath the arm 161, there is secured a short arm 165 provided at its outer end with an anti-friction cam follower 166 arranged to track along a cam 167 which, while it encircles the shaft 156, nevertheless is secured in a fixed position by a bracket 168 attached to a stationary portion of the machine (Figs. 7 and 8).

During the operation of the cam shaft 140, and when the cam follower 166 is tracking along the low portion of the fixed cam 167, the pawl 163 remains engaged with the ratchet wheel 155 so that the upper shaft 87 rotates in synchronism with the lower shaft and so long as the upper shaft 87 continues to rotate the tab strip feeding mechanism continues to feed the tab strip transversely of the traveling web. However, when the cam follower 166 rides up upon the high portion of the cam 167, the pawl 163 is withdrawn out of engagement with the ratchet wheel 155. With the pawl disengaged, the upper shaft 87 comes to rest and remains at rest until the cam follower 166 rides off the high portion of the cam and onto the low portion thereof. This permits the pawl 163 again to be pressed by the spring 164 into engagement with the ratchet wheel 155 thereby to reinaugurate the rotation of the upper shaft 87 and consequently the feed of the tab strip. The position of the cam 167 is so adjusted that the feed of the tab strip is arrested coincidentally with the arrival of the leading end of the tab strip at the remote edge of the traveling web. Furthermore, the intermediate gearing and chain drive connections between the cam shaft 140 and the tab strip feeding rolls are such that the tab strip travels the full width of the traveling web during each complete rotation of the cam shaft.

During the time the tab strip feed is interrupted, the tab strip cutting knives 98 and 99 operate to sever the tab strip and the tab strip guide member 120 operates to apply the tab strip to the traveling web as previously described.

It will be recalled that the tab strip severing device and the device for applying the tab strip to the traveling web are respectively operated by the cylinder and piston devices 115 and 131. These devices are connected each with a source of air pressure (not shown) through a pipe line 169 and a valve 170 which controls the flow of air to and from its associated cylinder and piston device. Since the valves are the same only one has been illustrated (Fig. 16). This valve is a standard three-way valve, the details of which are not shown, but which is provided with a pivoted lever 171 adapted, when it is pressed toward the valve body, to establish a connection between the source of air pressure and the cylinder with which it is connected and, when released, to return to its normal position to cut off the supply of air and vent the cylinder to the atmosphere. The valves associated with the respective cylinder and piston devices are operated each by a cam on the cam shaft 140, a cam 172 operating the valve associated with the tape severing device and a cam 173 operating the valve associated with the tab strip applying device. In the course of the rotation of the cam shaft 140 and after the tab strip feeding mechanism has been interrupted, a high portion 174 on the cam 172 arrives opposite a cam follower 175 which is arranged at the end of the lever arm 171 associated with its respective valve. This operates the valve to effect the tab strip severing operation and, as soon as the high portion of the cam has traveled past the cam follower, the valve assumes its normal condition in which the cylinder is vented, thereby permitting the tab strip severing mechanism to be restored to its normal position.

Thereafter, a similar high portion on the cam 173 actuates in like manner its associated valve to operate the tab strip applying device in the manner hereinbefore described. It is after the operation of the tab strip applying device and its return to normal position that the pawl and ratchet mechanism operates to reinaugurate the tab strip feeding operation.

As the operator observes the applied tab strips approaching the position of the wind-up cores on the mandrels 23 and 27, he may stop the machine in the usual manner as by shutting off the supply of current to the driving motor. The tapes can then be severed at the position of the tabs and the ends of the tape at the leading end of the traveling web started on new cores for the next wind-up operation. Obviously, however, the stopping of the machine has nothing to do with the tab strip applying cycle even though mechanism controlled from the cam shaft 140 could be used to stop the machine automatically, if desired. Actually, it would make no difference, so far as the instant invention is concerned, whether or not each length of tape between the respective tabs is applied to separate wind-up cores. Indeed, if desired, the web could be caused to travel past the platen roll without slitting and wound up on a large bundle roll in which the tab strips would occur at equal intervals throughout the length of the wound up web. There are numerous instances in which this might be desirable.

The invention has been described in connection with one embodiment thereof and by way of example only and many modifications thereof are included within its spirit. It is to be understood therefore that the invention is to be limited only by the prior art and the scope of the appended claims.

What is claimed is:

1. A machine for applying a tab strip at predetermined intervals along a traveling web and which includes a supply of tab strip material, means for feeding a length of tab strip material from said supply transversely to the direction of travel of the web and into a position immediately adjacent the traveling web, a device for severing, from the supply, the length of tab strip material thus positioned, means for applying the severed tab strip to the web after a predetermined length of the web has traveled past said position, control mechanism for timing the operation of the severing device and the tab strip applying means, and a common drive for effecting the travel of the web and the operation of the control mechanism.

2. A machine for applying a tab strip at predetermined intervals along a traveling web and which includes a supply of tab strip material, means for feeding a length of tab strip material from said supply transversely to the direction of travel of the web and into a position immediately adjacent the traveling web, a device for severing, from the supply, the length of tab strip material thus positioned, means for applying the severed tab strip to the web after a predetermined length of the web has traveled past said position, control mechanism for interrupting the feed of the tab strip material after a predetermined length thereof has been fed and for timing the operation of the severing device and the tab strip applying device, and a common drive for effecting the travel of the web and the operation of the control mechanism.

3. A machine for applying a tab strip at predetermined intervals along a traveling web and which includes a supply of tab strip material, means for feeding a length of tab strip material from said supply transversely to the direction of travel of the web and into a position immediately adjacent the traveling web, a device for severing, from the supply, the length of tab strip material thus positioned, means for applying the severed tab strip to the web after a predetermined length of the web has traveled past said position, control mechanism for interrupting the feed of the tab strip material after a predetermined length thereof has been fed, for timing the operation of the severing device and the tab strip applying means, and for thereafter reinaugurating the feed of the tab strip material, and a common drive for effecting the travel of the web and the operation of the control mechanism.

4. A machine for applying a tab strip at predetermined intervals along a traveling web and which includes a shiftable guideway into which the tab strip is endwise movable and from which the tab strip is edgewise removable when the guideway is shifted to bring the tab strip therein into contact with the traveling web, means for feeding the tab strip endwise into the guideway, means for shifting the guideway into tab strip removal position, a tab strip severing device located intermediate the guideway and the tab strip feeding means, control mechanism for timing the operation of the tab strip severing device and the guideway shifting means, and a common drive for effecting the travel of the web and the operation of the control mechanism.

5. A machine for applying a tab strip at predetermined intervals along a traveling web and which includes a shiftable guideway into which the tab strip is endwise movable and from which the tab strip is edgewise removable when the guideway is shifted to bring the tab strip therein into contact with the traveling web, means for feeding the tab strip endwise into the guideway, means for shifting the guideway into tab strip removal position, a tab strip severing device located intermediate the guideway and the tab strip feeding means, control mechanism for interrupting the operation of the feeding means and for timing the operation of the tab strip severing device and the guideway shifting means during the period of interruption, and a common drive for effecting the travel of the web and the operation of the control mechanism.

6. A device for applying a tab strip to a traveling web which includes a shiftable guideway into which the tab strip is endwise movable and from which the tab strip is edgewise removable when the guideway is shifted to bring the tab strip therein into contact with the traveling web, means for feeding the tab strip endwise into the guideway, and a tab strip severing device located intermediate the guideway and the tab strip feeding means.

7. A device for applying a flexible tab strip to a traveling web which includes a shiftable guideway into which the tab strip is endwise movable and from which the tab strip is edgewise removable when the guideway is shifted to bring the tab strip therein into contact with the traveling web, means for feeding the tab strip endwise into the guideway comprising instrumentalities for longitudinally crimping the tab strip, and a tab strip severing device located intermediate the guideway and the tab strip feeding means.

8. A device for applying a flexible tab strip to a traveling web and which includes a guideway into which the tab strip is endwise movable and from which the tab strip is edgewise removable when the guideway is shifted to bring the tab strip into contact with the traveling web, means for feeding the tab strip into the guideway, means for shifting the guideway into tab strip removal position, a tab strip severing device located between the guideway and the tab strip feeding means, operating means for the severing device, and control mechanism for interrupting the operation of the tab strip feeding means after a predetermined length thereof has been fed into the guideway, and for thereafter timing the operation of the tab strip severing device and the guideway shifting means.

9. A device for applying a flexible tab strip to a traveling web and which includes a guideway into which the tab strip is endwise movable and from which the tab strip is edgewise removable when the guideway is shifted to bring the tab strip into contact with the traveling web, means for feeding the tab strip into the guideway, means for shifting the guideway into tab strip removal position, a tab strip severing device located between the guideway and the tab strip feeding means, operating means for the severing device, and control mechanism for interrupting the operation of the tab strip feeding means after a predetermined length thereof has been fed into the guideway, for timing the operation of the tab strip severing device and the guideway shifting means, and for thereafter reinaugurating the operation of the tab strip feeding means.

10. A device for applying a flexible tab strip to a traveling web and which includes a guideway into which the tab strip is endwise movable and from which the tab strip is edgewise removable when the guideway is shifted to bring the tab strip into contact with the traveling web, means for feeding the tab strip into the guideway, means for shifting the guideway into tab strip removal position, a tab strip severing device located between the guideway and the tab strip feeding means, and mechanism, including a common operating element, for interrupting for a given period the operation of the tab strip feeding means and for effecting the operation of the tab strip severing device and the guideway shifting means during said period of interruption.

ALEXANDER J. STANLEY.

REFERENCES CITED

The following references are of record in the file of this patent:

UNITED STATES PATENTS

| Number    | Name      | Date         |
|-----------|-----------|--------------|
| 1,723,068 | Parsons   | Aug. 6, 1929 |
| 2,157,556 | Menschner | May 9, 1939  |